Figure 1:
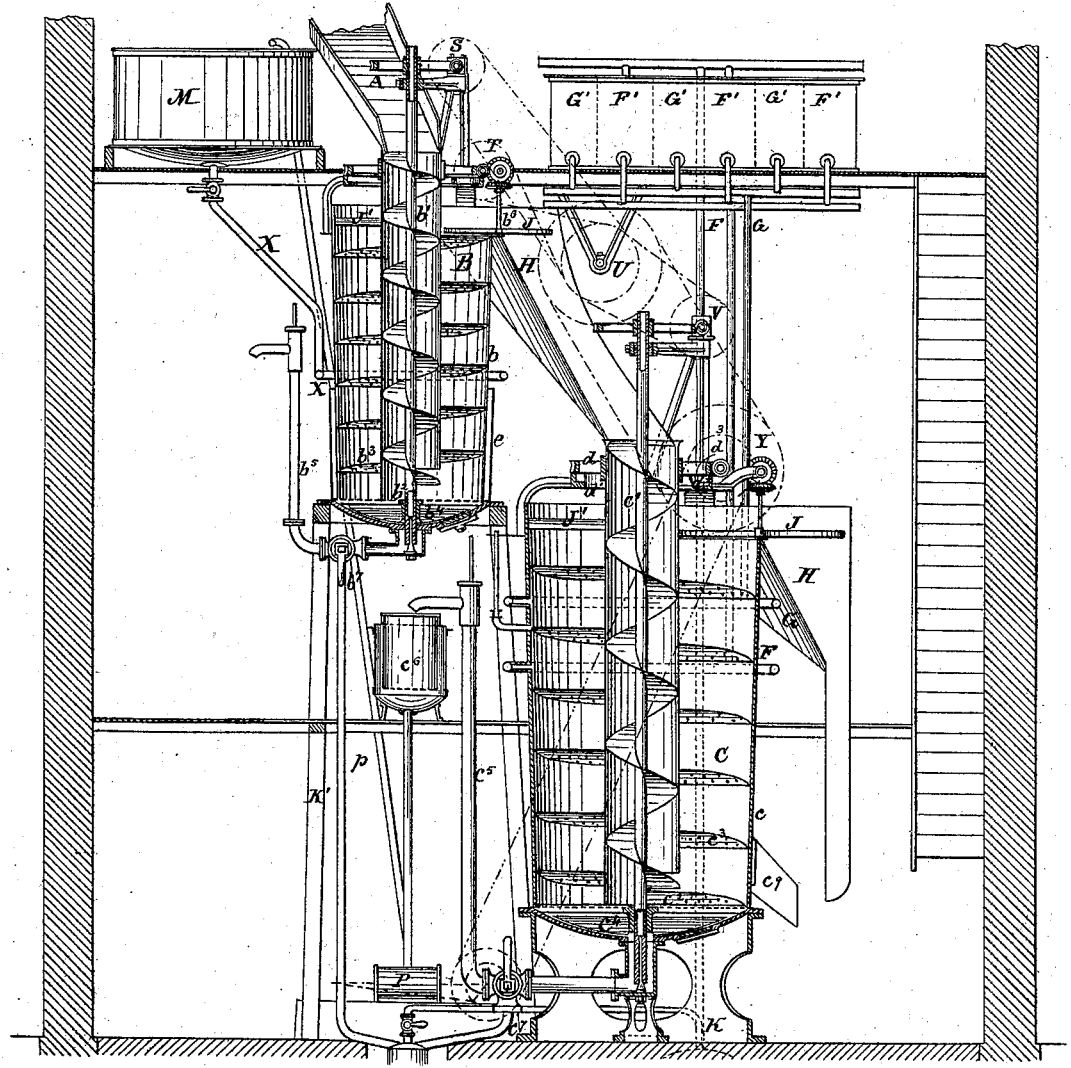

2 Sheets--Sheet 1.

G. WILKINSON, A. L. POSSOZ, J. P. LAFARGUE, A. E. DUTREIH.
Presses and Apparatus for Extracting the Juices of Sugar Cane, &c.

No. 137,746. Patented April 8, 1873.

2 Sheets--Sheet 2.

G. WILKINSON, A. L. POSSOZ, J. P. LAFARGUE, A. E. DUTREIH.

Presses and Apparatus for Extracting the Juices of Sugar Cane, &c.

No. 137,746.  Patented April 8, 1873.

Witnesses

Inventors

UNITED STATES PATENT OFFICE.

GEORGE WILKINSON, ANTOINE L. POSSOZ, JEAN P. LAFARGUE, AND AUGUSTE E. DUTREIH, OF PARIS, FRANCE.

IMPROVEMENT IN PROCESSES AND APPARATUS FOR EXTRACTING THE JUICES OF SUGAR-CANE, &c.

Specification forming part of Letters Patent No. 137,746, dated April 8, 1873; application filed March 26, 1873.

*To all whom it may concern:*

Be it known that we, GEORGE WILKINSON, ANTOINE LOUIS POSSOZ, JEAN PAUL LAFARGUE, and AUGUSTE EMILE DUTREIH, all of Paris, France, have invented certain new and useful Improvements in Method of and Apparatus for Extracting the Juices of Cane and other saccharine substances, and utilizing the products thereof, of which the following is a specification:

The principal object of this invention is to extract saccharine juices (of beets, sugar-cane, maize, &c.) more completely, more rapidly, and with less waste than has been practicable by the processes heretofore employed. We operate generally on these saccharine vegetable substances when reduced to thin slices or small pieces; but we can likewise act on the residuary product known as bagasse, to extract therefrom the juice which the rollers were incapable of obtaining. In the latter case, if the bagasse is not sufficiently reduced, we divide it still more by means of a suitable grinding or chopping apparatus. For greater clearness we will designate under the name of "prepared stuff" saccharine vegetable substances suitably divided and reduced.

These substances having been cut up or reduced by any of the ordinary or known reducing-machines, we then employ the method of extracting the juice, with the assistance of improved macerating apparatus, which we shall proceed to describe in illustration of the manner in which our invention may be carried into effect, it being understood, however, that we do not limit ourselves to the special forms and arrangements shown, as the same may be varied considerably without departure from our invention.

We can employ one macerator or several macerators conjoined; generally two conjoined macerators will suffice to obtain a good result.

The operation of the apparatus is based on the action of heat acting simultaneously on the prepared stuff and on the saccharine juice, in such manner that the prepared stuff is subjected at once to the action of the juice and to that of heat furnished over and above that of the juice, in proportion as the prepared stuff is supplied from the feed-hopper, so that the prepared stuff shall be used up as fast as it is produced, and continuously. In order to attain this result we employ for the vegetable substance a system of continuous circulation, regular and perfectly exact, in a direction opposite to the movement imparted to the water or the dilute or weak juice, under the hereinafter-stated conditions of heating, duration, and chemical action; and we thus extract saccharine juices of a special quality not obtained by any of the processes hitherto known and used. The more we heat the mixture of prepared stuff and weak juices at elevated temperatures (say, between 70° centigrade and the boiling-point, but only during some minutes) the more rapidly we extract, and, consequently, the smaller may be the apparatus to perform a required amount of work.

Although the action of the heat will alone suffice for the work, nevertheless we contemplate at times availing ourselves of the added action of sulphites, especially the sulphite of lime, either pure or with the addition of carbonate of lime, in order to prevent the change of the sugar.

Beside the sulphites, which have already been availed of under other conditions, we can employ other antiseptics which have the advantage of disappearing from the juice during the evaporating processes. These antiseptics are the chlorides of sulphur, the sulphuret of carbon, well-rectified essential oils, and the various carburets of hydrogen, sufficiently volatile to be completely evaporated during the concentration and cooking of the sirups, such as the light oils of petroleum, &c. After having protected the saccharine juice during its extraction, they are finally eliminated during the evaporation of the juice.

It often suffices to employ infinitesimal doses of these volatile bodies (less than one-hundred-thousandth part by weight of the saccharine vegetable) in order to prevent change in the sugar.

When we operate at elevated temperatures and as rapidly as possible without any interruption, and with fresh unfermented vegetable substances, we can then dispense with antiseptic agents, but if the conditions are otherwise we do not hesitate to avail ourselves of these agents, their expense being largely compensated by the advantages derived from their use.

Figure 2:
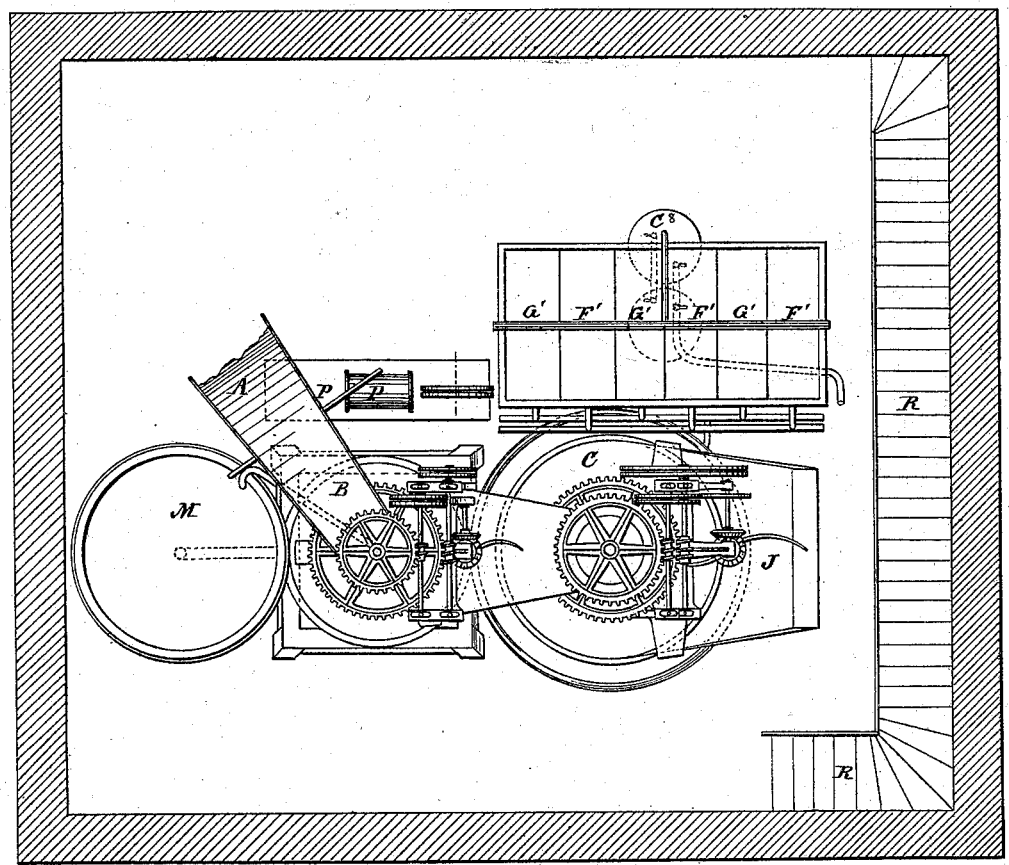

In the accompanying drawing, Figure 1 is a vertical section, and Fig. 2 a plan, of an apparatus composed of two conjoined macerators, together with the accessory parts needed for their proper operation.

A is the feed-hopper, through which passes the saccharine vegetable substances, suitably divided or reduced. B is the small macerator. It differs from the large macerator C in this, that, besides having generally five or six times less capacity than the latter, it is provided with a jacket, $e$, designed to receive the heating agent, such as steam, while the large macerator C should only be protected against cooling by a wooden or other suitable casing.

The small macerator B is designed for the purpose of saturating or soaking the vegetable substance with the juice which issues from the macerator C, heating the mixtures to the desired temperature and for the required length of time, according as the vegetable substance is more or less woody, and according to local circumstances, the price of fuel, &c., conditions which can be regulated easily and at will, in order to obtain the densest possible juice.

The proportional capacities of the two macerators are determined by the following considerations: First, the temperature to which the mixture of the prepared stuff and juice in the small macerator B is to be raised; second, the length of time the heating is to continue; third, the time during which the washing and exhausting in the large macerator C continue.

The time required for the operations in each macerator may be also modified and determined, to some extent, by the velocities imparted to their helices. In general, for prepared stuff, consisting of slices or pieces of from one to three millimetres in thickness, it will suffice to maintain the temperature of the charge or mixture of prepared stuff and juice between 70° and 80° centigrade during from four to six minutes in the small macerator B, and afterward to wash the prepared stuff for from twenty to thirty minutes in the macerator C with warm water at about 60° centigrade in order to drain or exhaust them completely.

The prepared stuff, passing from the hopper A, enters the central tube $b^1$, containing a helix, which pushes or propels it downward through the juice toward the perforated false bottom $b^2$ of the tub or vat $b$. The tube $b^1$ carries at its lower end a flange or deflector, by which the prepared stuff is directed into the large perforated helix $b^3$, which extends close to the sides of the tub, and causes the prepared stuff to ascend, with great regularity and precision, toward the top of the tub $b$. During this ascent the prepared stuff is traversed in a direction opposite to that in which it moves by a current of juice arising from the straining of the preceding prepared stuff, and discharged through the tube $c^5$ from the macerator C. The juice discharged from tube $c^5$ is strained in movable filters, placed in the receiver $c^6$, and thence is raised through a tube $p$, by means of pump P, into the boiler or heater $m$, where the juice can be heated at pleasure before entering the macerator B through the pipe X. It will then suffice to furnish to the macerator B, through the medium of its steam-jacket, the caloric needed to heat the prepared stuff to the temperature at which it is desired to maintain the mixture. The juice, being already heated, acquires rapidly, in a few minutes, the maximum density that it can attain; and then passes out through tube $b^5$, whence it may be conducted to the defecating or depurating apparatus. The prepared stuff, after this heating, is ejected from the upper end of tub $b$, and is then taken by the scraper $J^1$ and conveyer J, and is discharged along the incline H into the central tube $c^1$ of the large macerator C. The latter differs only in dimensions from the smaller macerator B, and is shown plainly in the drawing, so that a description of its parts need not be repeated. During its ascent in the larger helix $c^3$ the prepared stuff is subjected to two washings, which completely remove from it the saccharine juice it may still contain. These washings are effected by means of two water-distributers, F and G, leading from their respective reservoirs. The lower distributer F is supplied with slightly saccharine water, which results from the squeezing or pressing of the spent stuff. This water, after being expressed, should be immediately raised to the boiling-point, and to it should be added antiseptic agents, if such are to be employed.

The upper distributer G is supplied with water as far as possible pure. It is very essential to measure or regulate the volumes of the prepared stuff and of the water which enters at each charging of the apparatus, in such manner that the mixture shall continue fluid. In general, equal volumes of the prepared stuff and water are good proportions, but it should be noted that the same water is used several times, so that there should be used two series of measuring-vessels, $F^1$ and $G^1$, consisting in all of, say, six vessels, three charged with one kind of water and three with the other kind, in order that in each series, while one vessel is being emptied the other may be filled and the third may be ready for use. Thus, while a determinate weight or volume of prepared stuff is entering the macerator B, corresponding volumes of heated expressed water and of cool fresh water should enter the macerator C through their respective distributers. The large helix $c^3$ is perforated so that the passage of the water through it takes place in a direction contrary to that in which the prepared stuff moves. The height of this helix, however, may be less than that of the tub. The helix $c^3$ is fixed on its tube $c^1$, and is actuated by an endless screw, which engages a toothed wheel, $d$, fixed to the helix or its supporting tube. The wheel $d$ revolves on a series of vertical rollers, $d^1$ $d^1$, and horizontal rollers $d^2$ $d^2$, and thus sustains, and at the same time revolves, the tube $c^1$ and helix $c^3$. The helix $b^3$ of the macerator B is arranged and actuated in a similar manner.

When the prepared stuff reaches the top of the large tub, where the incline H is located, it will have been exhausted of saccharine matter. It can thence be discharged or taken off either by hand or, preferably, by the scrapers J J'. It should be then immediately pressed in order to extract from it the water which it still contains, which water is treated and employed, as has been above explained.

We much prefer to use two conjoined macerators under the arrangement above described. It will be understood, however, that we can use but one macerator, in which we unite the functions of the two, hereinbefore described.

For the extraction of beet-juice, the macerators and their accessory parts should be preferably constructed of wrought or cast iron; but in extracting the acid juices of cane, maize, and sorghum, it is better to avoid contact of these juices with iron, and to form the surfaces, with which the juices may come in contact, of copper or brass. Under all circumstances, however, the tub of the large macerator C can be built of wood or masonry. Still, we can employ for the purpose galvanized wrought or cast iron, or iron plated with copper, and even ordinary wrought and cast iron may be used, by taking the precaution to render neutral or slightly alkaline the juices intended for sugar-making.

For distilling purposes the discoloration of the juice is of no importance, and any convenient material may therefore be used in constructing the apparatus. Juices thus extracted by our process are fitted for sugar-manufacture or for distillation without requiring any change in the apparatus for defecating, evaporating, or distilling.

The prepared stuff, after its final pressing, can be used as fuel; but, by reason of the thorough washing which it has undergone, is well adapted for use in the production of pasteboard, &c.

What we claim, and desire to secure by Letters Patent, is—

1. The mode herein described of extracting the saccharine matter of cane and other saccharine substances, by subjecting the same, when suitably prepared or divided, to the action of heated saccharine juice, followed by washing in a mixture of dilute juice and pure water, said operations being conducted in apparatus substantially such as specified, and in the manner set forth.

2. The combination of two or more macerators, substantially such as described, into and through which the prepared cane or other saccharine substance is successively passed, as set forth, the liquids with which said substance is treated during its passage through said macerators being obtained and supplied to and discharged from said macerators substantially in the manner specified.

3. An apparatus for extracting the juices of sugar-cane and other saccharine vegetable substances, the parts of which are constructed, combined, and arranged for operation, substantially as herein shown and set forth.

In testimony whereof we have signed our names to this specification before two subscribing witnesses.

GEORGE WILKINSON.
 ANTOINE LOUIS POSSOZ.
 JEAN PAUL LAFARGUE.
 AUGUSTE EMILE DUTREIH.

Witnesses:
 E. RANAULT,
 AUG. VINCK.